United States Patent [19]

Radovich et al.

[11] Patent Number: 6,034,147
[45] Date of Patent: Mar. 7, 2000

[54] METHOD AND APPARATUS FOR THE PRODUCTION OF ESSENTIALLY VOID FREE FOAMS

[75] Inventors: David A. Radovich, Pittsburgh; David D. Steppan, Gibsonia; Keith G. Spitler, Burgettstown; James D. Shoup, Bulger, all of Pa.

[73] Assignee: Bayer Corporation, Pittsburgh, Pa.

[21] Appl. No.: 09/107,301

[22] Filed: Jun. 30, 1998

Related U.S. Application Data

[62] Division of application No. 08/960,493, Oct. 29, 1997, Pat. No. 5,801,210.

[51] Int. Cl.[7] ........................................ C08J 9/04
[52] U.S. Cl. ..................... 521/130; 521/155; 264/50; 264/53; 366/177.1; 366/182.1; 366/192; 366/336; 425/4 R; 425/130; 425/817 R
[58] Field of Search ................................ 521/130, 155; 264/50, 53; 366/177.1, 182.1, 192, 336; 425/4 R, 130, 817 R

[56] References Cited

U.S. PATENT DOCUMENTS

| | | | |
|---|---|---|---|
| 4,906,672 | 3/1990 | Stone et al. | 521/130 |
| 5,118,720 | 6/1992 | Wheeler et al. | 521/99 |
| 5,120,770 | 6/1992 | Doyle et al. | 521/99 |
| 5,578,655 | 11/1996 | Fiorentini | 521/155 |
| 5,620,710 | 4/1997 | Fiorentini et al. | 424/4 C |
| 5,629,027 | 5/1997 | Fiorentini et al. | 425/4 C |
| 5,801,210 | 9/1998 | Radovich et al. | 521/130 |
| 5,834,527 | 11/1998 | Sulzbach . | |
| 5,883,143 | 3/1999 | Eiben et al. . | |

*Primary Examiner*—John M. Cooney, Jr.
*Attorney, Agent, or Firm*—Joseph C. Gil; Lyndanne M. Whalen; Noland J. Cheung

[57] ABSTRACT

A process for the manufacture of polyurethane foam comprising the steps of (i) mixing at a reaction index of 40 to 400: (a) a polyisocyanate blend comprising at least one polyisocyanate and optionally, additives and fillers; (b) a polyol blend comprising isocyanate reactive components and optionally, water, additional blowing agents, catalysts, surfactants, fillers and other additives; wherein either or both said polyisocyanate blend or said polyol blend contain between 0.3 to about 20 wt. % $CO_2$ based on the total weight of said polyisocyanate blend and said polyol blend; (ii) introducing and uniformly mixing in liquid form of $CO_2$ as a blowing agent into either or both said polyisocyanate blend or said polyol blend and maintaining said $CO_2$ in said liquid form. The present invention also relates to an apparatus, which performs the above-mentioned process.

8 Claims, 1 Drawing Sheet

METHOD AND APPARATUS FOR THE PRODUCTION OF ESSENTIALLY VOID FREE FOAMS

This application is a Divisional of U.S. application Ser. No. 08/960,493 filed Oct. 29, 1997 which is now U.S. Pat. No. 5,801,210.

FIELD OF THE INVENTION

The present invention relates to a process and apparatus for producing essentially void-free foams using liquid carbon dioxide as a blowing agent.

BACKGROUND OF THE INVENTION

When producing polyurethane foams, at least one of the reactive components (polyisocyanate and compounds which contain isocyanate-reactive hydrogen atoms, in particular polyols) is sometimes mixed with a liquid or gaseous blowing agent and then mixed with the other component to make foam.

The blowing agent is employed in order to enhance the expansion of the foam which is obtained from the reaction of the water with the isocyanate. Blowing agents used are either low-boiling liquids such as low-molecular chlorofluorocarbons, methylene chloride, pentane, and the like, which evaporate due to the increase in temperature of the reactive mixture in the course of the exothermic polyaddition reaction, which chemically releases carbon dioxide due to the reaction between the water and the isocyanate.

For reasons of environmental compatibility and occupational hygiene and because of the comparatively high solubility of liquid carbon dioxide in the polyol component, liquid carbon dioxide has already been proposed as an auxiliary blowing agent on several occasions.

Polyurethane foams using $CO_2$ as an auxiliary blowing agent and produced using impingement mixing, have shown a tendency towards voiding or "pin-holing" making this approach limited in commercial application.

Liquid carbon dioxide as a blowing agent has been suggested, for example, by Fiorentini, et al. (U.S. Pat. Nos. 5,578,655, 5,629,027 and 5,620,710) and Doyle, et al. (U.S. Pat. No. 5,120,770).

It is known to use equipment consisting essentially of a standard molded foam machine design with the addition of a high pressure $CO_2$ addition unit. The $CO_2$ is injected into the polyol stream just before it enters the mixhead. Even though the $CO_2$ is maintained as a liquid, there is not enough time for the $CO_2$ and polyol to become a homogenous mixture before it reaches the mixhead which often results in voiding or pin-holing.

It is also known to use a process comprising a $CO_2$ cylinder and a high pressure day tank fitted with a gas nucleation device. In this method, the machine is fitted with a higher pressure (300 psi max) $CO_2$ addition unit, a high pressure day tank, and a static mixer (in the recycle loop to the mixhead). In this method, the $CO_2$ is pumped into the static mixer in the recycle line, $CO_2$ flow is discontinued when the $CO_2$ pressure solubility has reached the desired equilibrium point. Once this has been completed, the polyol tank pressure is further increased with $N_2$ to ensure that the proper amount of $CO_2$ remains in solution. Since $CO_2$ gas is present in the polyol tank to maintain this equilibrium, all of the gas is not in the liquid state.

Another approach, differs from the previous approach by having the $CO_2$ introduced into the isocyanate tank instead of the polyol tank.

Fiorentini, et al. discloses a continuous slabstock foam process. The $CO_2$ is injected at high pressure into the polyol system as it is being pumped to the mixhead (with a mechanical agitator). The mixture passes through a static mixer, a collector block where the foam activators are added and finally into the mixing chamber where the polyol and isocyanate are mixed. Before being dispensed onto a conveyor, the foam mixture passes through a pressure letdown device, which is not required in the present invention, at the end of the mixhead, which reduces the tendency towards voiding.

SUMMARY OF THE INVENTION

The present invention relates to a process for the manufacture of polyurethane foam comprising the steps of
(i) mixing at a reaction index of 40 to 400:
  (a) a polyisocyanate blend comprising at least one polyisocyanate and optionally, additives and fillers;
  (b) a polyol blend comprising isocyanate reactive components and optionally, water, additional blowing agents, catalysts, surfactants, fillers and other additives;
  wherein either or both said polyisocyanate blend or said polyol blend contain between 0.3 to about 20 wt. % of $CO_2$ based on the total weight of said polyisocyanate blend and said polyol blend; and
(ii) introducing and uniformly mixing in liquid form $CO_2$ as a blowing agent into either or both said polyisocyanate blend or said polyol blend and maintaining said $CO_2$ in said liquid form.

The present invention also relates to an apparatus for performing the above-mentioned process.

DESCRIPTION OF THE INVENTION

Figure 1:
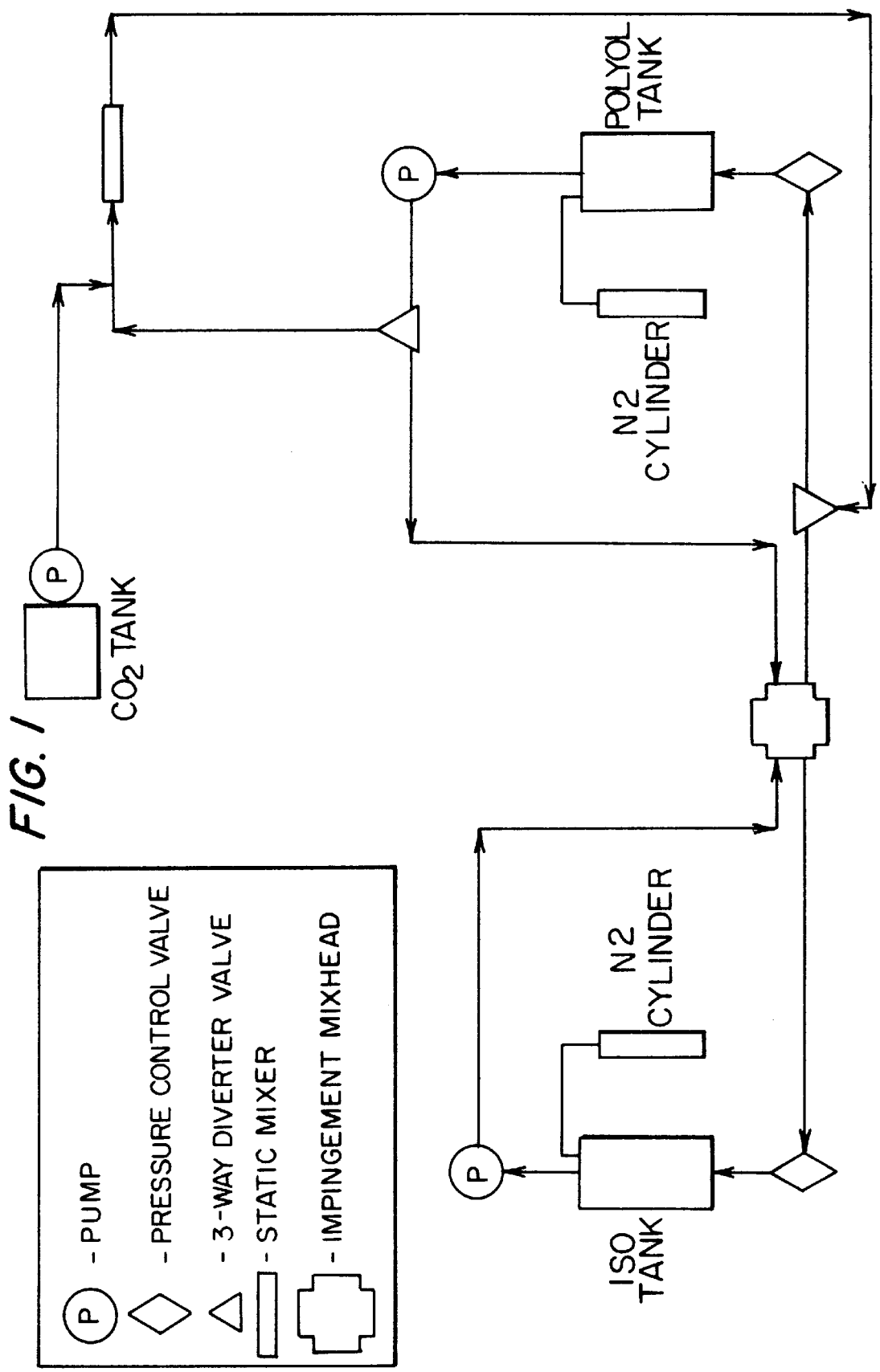
FIG. 1 is a schematic diagram of the process of the present invention.

The present invention requires a process and apparatus which allow sufficient time for the $CO_2$/polyurethane raw material blend to become homogenous with respect to composition and temperature. Additionally, during the time the $CO_2$ is introduced into the raw materials until the time when the mixture is dispensed into the mixhead, this mixture is kept under conditions which would prohibit the $CO_2$ from ever becoming gaseous. Foams produced using this method are essentially void-free with a reduced tendency towards "pin-holing".

As shown in FIG. 1, the process comprises the steps of introducing the $CO_2$ into a stream of either polyol or polyisocyanate. In a preferred embodiment, the $CO_2$ is introduced into the polyol stream. In this preferred embodiment, the polyol stream process comprises two recycle loops, which both pass through a high pressure polyol day tank. The polyol day tank operates at a pressure between 800 to 1300 psi and a temperature between 65 to 100° F. The $CO_2$, which is initially at a temperature less than 5° F. and at a pressure of 200–350 psi and stored in a $CO_2$ tank, is raised to a pressure of 1200 to 2000 psi via a pump. Through a valve, preferably a check valve, the $CO_2$ is then introduced into the first recycle loop containing the stream of polyol which is exiting the polyol day tank at a pressure between 800 and 1400 psi and a temperature between 65 and 100° F. The polyol stream and $CO_2$ stream are mixed in a mixer, preferably a static mixer, at a pressure between 800 and 1600 psi and a temperature between 65 and 90° F. and recycled again through the polyol day tank and static mixer until the $CO_2$/polyol stream has reached homogeneity. When the $CO_2$/polyol stream is a homogenous mixture, liquid $CO_2$ is present in an amount from 0.3 to about 20 wt % based on the total weight of said polyisocyanate blend and said polyol blend. In a most preferred embodiment, liquid $CO_2$ is present in an amount from about 0.5 to about 10 wt. %. Once homogeneity has been achieved, the $CO_2$/polyol stream is diverted into the second recycle loop system through a valve. In a preferred embodiment, the valve is a 3-way diverter valve or a mixer recirculation valve. The $CO_2$/polyol stream exiting the first recycle loop and entering the second recycle loop, which is at a pressure between 800 and 5000 psi and preferably, at a pressure between 1200 to 3000 psi and a temperature between 65 and 100° F. is then introduced into a mixhead, wherein the $CO_2$/polyol stream is mixed with the polyisocyanate stream to make void-free foam. In a preferred embodiment, the mixhead is an impingement mixhead. Suitable impingement mixheads for use according to the present invention which are known and described can be found in, for example, Polyurethane Handbook, 2nd Edition, edited by Gunter Oertel, Chapter 7, pp. 129–135 and 158–170, Hanser Publishers, Munich, N.Y. Nitrogen may be added to the polyol day tank to increase pressure in the tank, which maintains the $CO_2$ in liquid form.

Additives may also be present in the polyol tank; these include isocyanate reactive components and optionally, water, additional blowing agents, catalysts, surfactants, fillers, emulsifiers, UV stabilizers, anti-oxidants, colors, plasticizers, flame retardants, and etc.

Suitable polyisocyanates for use according to the present invention include aliphatic, cycloaliphatic, araliphatic, aromatic and heterocyclic polyisocyanates which are known and described, for example, by W. Siefken in *Justus Liebigs Annalen der Chemie,* 562, pages 75–136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1, 3- and -1,4-diisocyanate and mixtures thereof; 1-isocyanato-3,3,5-trimethyl-5-isocyanatomethylcyclohexane (isophorone diisocyanate or IPDI); 2,4- and 2,6-hexahydrotoluene diisocyanate and mixtures thereof; hexahydro-1,3- and/or -1,4-phenylene diisocyanate; perhydro-2,4'- and/or 4,4'-diphenylmethane diisocyanate; 1,3- and 1,4-phenylene diisocyanate; 2,4- and 2,6-toluene diisocyanate and mixtures thereof; diphenylmethane 2,4'- and/or 4,4'-diisocyanate; naphthylene-1,5-diisocyanate; triphenylmethane-4,4',4"-triisocyanate; and polyphenyl polymethylene polyisocyanates of the type obtained by condensing aniline with formaldehyde, followed by condensation.

It is preferable to use readily available polyisocyanates such as 2,4- and 2,6-toluene diisocyanate and mixtures of such isomers; polyphenyl polymethylene polyisocyanates of the type obtained by condensing aniline with formaldehyde, followed by phosgenation; and polyisocyanates containing carbodiimide groups, urethane groups, allophanate groups, isocyanurate groups, urea groups, or biuret groups. Particularly preferred are the liquid derivatives of 4,4'-diphenylmethane diisocyanate (MDI) which may be liquefied by introducing carbodiimide groups, blending with 2,4'-diphenylmethane diisocyanate or by introducing urethane groups. Especially preferred are the liquefied derivatives of MDI prepared by reacting MDI with 0.1 to 0.3 mols of a polypropylene glycol having a molecular weight of up to about 700, in particular, dipropylene glycol, tripropylene glycol or mixtures thereof as disclosed, for example, in U.S. Pat. No. 3,644,457.

Also suitable for use as the polyisocyanate component are isocyanate-terminated prepolymers based on the above-mentioned polyisocyanates and the isocyanate-reactive compounds, preferably hydroxyl compounds, disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Suitable isocyanate-reactive compounds include those containing at least two isocyanate-reactive groups. Such compounds can be divided into two groups: high molecular weight compounds having molecular weights of 400 to about 10,000 and low molecular weight compounds (i.e., chain extenders) having molecular weights of 62 to 399. Examples of suitable high molecular weight compounds include the polyesters, polyethers, polythioethers, polyacetals and polycarbonates containing at least 1.5, preferably 2 to 8 and most preferably 2 to 4 isocyanate-reactive groups of the type known for the production of polyurethanes.

High molecular weight polyethers suitable for use in accordance with the invention are known and may be obtained, for example, by polymerizing epoxides such as ethylene oxide, propylene oxide, butylene oxide, tetrahydrofuran, styrene oxide, or epichlorohydrin in the presence of $BF_3$ or by chemically adding these epoxides, preferably ethylene oxide and propylene oxide, in admixture or successively to components containing reactive hydrogen atoms such as water, alcohols, or amines. Examples of alcohols and amines include the low molecular weight chain extenders set forth hereinafter, 4,4'-dihydroxydiphenylpropane, sucrose, aniline, ammonia, ethanolamine, and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383, 351, 3,304,273, 3,523,093, and 3,110,695; and German Patent 1,152,536), are also suitable, as are polybutadienes containing OH groups.

Polyether polyols which contain high molecular weight polyadducts or polycondensates in finely dispersed form or in solution can also be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols. Examples of suitable high molecular weight polyesters include the reaction products of polyhydric, preferably dihydric alcohols (optionally in the presence of trihydric alcohols), with polyvalent (preferably divalent) carboxylic acids. Instead of using the free carboxylic acids, it is also possible to use corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted (for example, by halogen atoms). The polycarboxylic acids and polyols used to prepare the polyesters are known and described, for example, in U.S. Pat. Nos. 4,098,731 and 3,726,952, herein incorporated by reference in their entirety. Suitable polythioethers, polyacetals, polycarbonates, and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders and Frisch, Interscience Publishers, New York, London, Vol. I, 1962, pages 32–42 and 44–54, and Volume 11, 1964, pages 5–6 and 198–199; and in Kunststoff-Handbuch, Vol. VII, Vieweg-Höchtlen, Carl Hanser Verlag, Munich, 1966, pages 45–71.

Suitable aminopolyethers that may be used according to the present invention as high molecular weight compounds (the molecular weight always being the number average molecular weight which may be calculated from the functionality and the content of isocyanate-reactive groups) are those wherein at least about 30 and preferably about 60 to 100 equivalent percent of the isocyanate-reactive groups are primary and/or secondary (preferably primary) aromatically or aliphatically (preferably aromatically) bound amino groups and the remainder are primary and/or secondary aliphatically bound hydroxyl groups. In these compounds, the terminal residues carrying the amino groups may also be attached to the polyether chain by urethane or ester groups. Such "aminopolyethers" are prepared by known methods. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, or chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and in French Patent 1,551,605. The production of polyethers containing terminal secondary amino groups is described, for example, in French Patent 1,466,708.

Polyhydroxypolyethers of relatively high molecular weight can be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428, and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of NCO prepolymers based on polyhydroxypolyethers with enamines, aldimines, or ketimines containing hydroxyl groups and subsequent hydrolysis.

It is preferred to use amino polyethers obtained by hydrolysis of compounds containing terminal isocyanate groups, for example, in accordance with German Offenlegungsschrift 2,948,419 or U.S. Pat. No. 4,515,923, herein incorporated by reference in its entirety. In this process, polyethers, most preferably containing 2 to 4 hydroxyl groups, are allowed to react with polyisocyanates to form NCO prepolymers and, in a second step, the isocyanate groups are converted by hydrolysis into amino groups.

Aminopolyethers used in accordance with the invention are often mixtures of the compounds mentioned by way of example and (on a statistical average) most preferably contain 2 to 4 terminal isocyanate-reactive groups. In the process according to the invention, the aminopolyethers may be used in admixture with polyhydroxypolyethers free from amino groups.

Hydroxyl terminated prepolymers such as those described and prepared in Kogon, et al. (U.S. Pat. No. 3,997,514) are also preferred.

In addition to liquid $CO_2$, other additional suitable blowing agents may include, for example, water, and physical blowing agents including, for example, low boiling alkanes, partially or completely fluorinated hydrocarbons, etc. Suitable low boiling alkanes include compounds such as, for example, acetone, pentane, hexane, cyclopentane, etc. Some examples of suitable partially or completely fluorinated hydrocarbons include compounds such as HFC-134a (1,1,1,2-tetrafluoroethane), HFC-245fa (1,1,1,3,3-pentafluoropropane), HFC-245ca (1,1,2,2,3-pentafluoropropane), HFC-236ca (1,1,1,2,3,3-pentafluoropropane). Methylene chloride is also a suitable blowing agent for the presently claimed invention. Mixtures of these various blowing agents are also suitable.

One or more catalysts may also be required to be present in the reaction mixture according to the present invention. Suitable catalysts include, for example, tertiary amine catalysts and organometallic catalysts.

Some examples of suitable organometallic catalysts include, for example organometallic compounds of tin, lead, iron, bismuth, mercury, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Other suitable catalysts for the present invention include, for example, dialkyltin mercaptides such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercaptoacetate), and di(isooctyl) tin bis(isooctylmercaptoacetate), all of which are commercially available from Witco Chemical Corp., and are especially preferred; and dialkyltin disulfides such as, for example, dibutyltin sulfide and dioctyltin sulfide are also suitable catalysts. The use of a delayed action catalyst such as an iron pentanedione or a bismuth carboxylate, as described in U.S. Pat. No. 4,611,044, herein incorporated by reference, is also possible.

Suitable heat-activated catalysts for the present invention are amine salts. These catalysts include aliphatic and aromatic tertiary amines, and epoxide adducts of tertiary amines. Quaternary ammonium salts of amines (i.e., alkoxylated tertiary amines) as described in, for example, U.S. Pat. Nos. 3,892,687, 4,116,879 and 4,582,861, the disclosures of which are herein incorporated by reference are also suitable in the present invention. Suitable heat-activated amine salts include compounds such as, for example, DABCO 8154 commercially available from Air Products, a formic acid blocked triethylene diamine, and other delayed action catalysts such as DABCO WT, also commercially available from Air Products; and Polycat SA-1 and Polycat SA-102 which are both acid-blocked versions of 1,8-diazabicyclo[5.4.0]-undecene-7 (i.e., Polycat DBU) and commercially available from Air Products. Trialkyl amines and heterocyclic amines are also suitable for the present invention. Suitable compounds include, for example, trimethylamine, triethylamine, tripropylamine, tributylamine, dimethylcyclohexylamine, dibutylcyclohexylamine, dimethylethanolamine, triethanolamine, diethylethanolamine, ethyldiethanolamine, dimethylisopropanolamine, triisopropanolamine, triethylene diamine, tetramethyl-1,3-butanediamine, N,N,N',N'-tetramethylethylenediamine, N,N,N',N'-tetramethylhexanediamine-1,6, N,N,N',N',N"-pentamethyldiethylenetriamine, bis(2-dimethylaminoethoxy)-methane, N,N,N'-trimethyl-N'-(2-hydroxyethylethyldiamine, N,N-dimethyl-N',N'-(2-hydroxyethyl)-ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)-morpholine, 1-methyl-4-(2-dimethylamino)-piperidine, 1,4-diazabicyclo-[2.2.2]octane, 2-methyl-1,4-diazabicyclo[2.2.2]octane quinuclidine, 1,5-diazabicyclo-[5.4.0]-5-undecene, and 1,5-diazabicyclo [4.3.0]-5-nonane.

Organometallic catalysts are usually used in amounts ranging from about 0.005 to about 0.5% by weight, preferably about 0.02 to 0.4% by weight, based on the total weight of the B-side of the formulation. Tertiary amine catalysts, or salts thereof, are advantageously used in amounts ranging from about 0.05 to about 2% by weight, preferably about 0.1 to about 0.5% by weight, based on 100% by weight, based on the total weight of the B-side of the formulation. It is preferred that the total quantity of catalysts be such that they comprise less than 3% by weight, preferably less than 2% by weight, based on the total weight of the B-side of the formulation.

It is also possible that various additives and/or auxiliary agents may be included in the formulation. Some examples of suitable additives include surface-active additives such as emulsifiers and foam stabilizers. Examples of these include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/-oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

In addition to the surface-active agents, other additives which may be used in the molding compositions of the present invention include known internal mold release agents, pigments, cell regulators, flame retarding agents, plasticizers, dyes, fillers and reinforcing agents such as glass in the form of fibers or flakes or carbon fibers, and antistatic agents.

The foam products according to the present invention may be prepared at isocyanate indexes ranging from about 40 to 400, preferably from 70 to 300. By the term "Isocyanate Index" (also commonly referred to as "NCO index"), is defined herein as the equivalents of isocyanate which are reacted with 100 equivalents of isocyanate-reactive hydrogen containing materials.

The invention is further illustrated but is not intended to be limited by the following examples in which all parts and percentages are by weight unless otherwise specified.

EXAMPLES

Example 1

In the examples which follow, the following materials were used:
A) BAYFIT 566 (A&B): A commercially available flexible foam system from Bayer Corporation. This system consists of an A-component (isocyanate blend) and a B-component (polyol blend) and is typically processed at an A:B ratio of 50.9 to 100 at a foam index of 100.
B) $CO_2$ A high pressure foam system was used to produce 15"×15"×4" molded foam blocks. All blocks were made using an open-pour process in an aluminum mold and were demolded after 4 minutes. Physical property testing was done according to the ASTM-3574 test methods.

In the following examples, Example A represents the standard or comparative foam system. In Example B, 2.0 phr $CO_2$ was added to the polyol blend according to the method described in this invention.

| FORMULATIONS | A | B |
|---|---|---|
| Bayfit 566A | 50.9 | 49.5 |
| Bayfit 566B | 100.0 | 98.0 |
| $CO_2$ | 0.0 | 2.0 |
| Foam Index | 100 | 100 |
| Physical Properties | | |
| Core Density, pcf | 2.87 | 2.22 |
| IFD 25/50 | | |
| SAG | 1.78 | 1.73 |
| Hysteresis | 13.1 | 12.5 |
| 25R, lbs | 33.0 | 19.9 |
| 50R, lbs | 58.6 | 35.5 |
| Tensile, kPA | 109 | 84 |
| Elongation, % | 109 | 107 |
| Tear, N/M | 136 | 139 |
| Ball Rebound, % | 65 | 68 |
| Airflow, cfm | 2.07 | 3.13 |
| 50% 2A comp.set (cd), % | 9.4 | 10.2 |
| 50% 2E comp.set (cd), % | 12.0 | 14.1 |
| Processing Conditions | | |
| Polyol injection pressure, psi | 1950 | 2000 |
| Polyol temperature, °F. | 93 | 89 |
| Polyol throughput, g/sec. | 101 | 101 |
| Isocyanate injection pressure, psi | 2500 | 2650 |
| Isocyanate temperature °F. | 82 | 91 |
| Isocyanate throughput, g/sec. | 52 | 50 |
| $CO_2$ recycle loop pressure, psi | N/A | 1200 |
| $CO_2$ liq. injection pressure, psi | N/A | 1800 |
| Time in mixing loop, min. | N/A | 30 |
| | The foams produced were non-shrinking and exhibited a fine and regular cell structure | The foams produced were non-shrinking and exhibited a fine cell structure with reduced tendency towards the inclusion of large cells (pin-holes). |

The lack of pin-holes of the foam of the present invention is also evident by the fact that the physical properties (esp. tear and elongation) did not degrade the result of defects in the foam cell structure.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for producing a polyurethane foam comprising:
   a) a day tank for receiving either a polyisocyanate or polyol stream and optionally, additives;
   b) a valve for introducing $CO_2$ in liquid form into a first recycle stream comprising either said polyisocyanate or polyol stream wherein said first recycle stream enters and exits said day tank; and
   c) a mixer for mixing said $CO_2$ and said polyisocyanate or polyol stream to form a liquid $CO_2$/polyisocyanate or polyol blend and recycling said liquid $CO_2$/polyisocyanate or polyol blend in said first recycle stream through said day tank and said mixer until said liquid $CO_2$/polyisocyanate or polyol blend forms a homogeneous mixture wherein said homogenous mixture contains between 0.3 to about 20 wt. % $CO_2$ based on said polyisocyanate and said polyol stream;
   d) a second valve for diverting said homogenous mixture to a second recycle stream wherein said second recycle stream enters a mixhead to mix with either said other polyol or polyisocyanate stream, respectively, to form foam.

2. An apparatus according to claim 1 wherein said day tank receives said polyol stream.

3. An apparatus according to claim 1 wherein said valve is a check valve.

4. An apparatus according to claim 1 wherein said mixer is a static mixer.

5. An apparatus according to claim 1 wherein said second valve is a 3-way diverter valve.

6. An apparatus according to claim 2, wherein said day tank operates at a pressure between 800 and 1400 psi and at a temperature between 65–100° F.

7. An apparatus according to claim 6, wherein said pressure is between 1000 and 1300 psi.

8. An apparatus according to claim 1 wherein said mixhead is an impingement mixhead.

* * * * *